(12) United States Patent
Fischer

(10) Patent No.: US 7,867,339 B2
(45) Date of Patent: Jan. 11, 2011

(54) PROCESS FOR CLEANING AN INSTALLATION

(75) Inventor: Sven Fischer, Obertraubling (DE)

(73) Assignee: Krones AG, Neutraubling (DE)

( * ) Notice: Subject to any disclaimer, the term of this patent is extended or adjusted under 35 U.S.C. 154(b) by 396 days.

(21) Appl. No.: 11/957,770

(22) Filed: Dec. 17, 2007

(65) Prior Publication Data

US 2008/0142041 A1      Jun. 19, 2008

(51) Int. Cl.
*B08B 7/04* (2006.01)
*B08B 3/00* (2006.01)

(52) U.S. Cl. .............................. 134/10; 134/26; 134/28; 134/29

(58) Field of Classification Search .................... 134/10, 134/26, 27, 28, 29; 210/739; 510/508; 216/93
See application file for complete search history.

(56) References Cited

U.S. PATENT DOCUMENTS

| | | | | |
|---|---|---|---|---|
| 4,427,567 A | * | 1/1984 | Benz | 510/441 |
| 4,938,872 A | * | 7/1990 | Strantz et al. | 210/639 |
| 2004/0033930 A1 | * | 2/2004 | Thonhauser | 510/508 |
| 2007/0020794 A1 | | 1/2007 | DeBar | |
| 2007/0102665 A1 | * | 5/2007 | Thonhauser | 252/186.1 |

FOREIGN PATENT DOCUMENTS

| | | |
|---|---|---|
| EP | 1343864 | 9/2003 |
| WO | WO-2005044968 | 5/2005 |

\* cited by examiner

*Primary Examiner*—Michael Barr
*Assistant Examiner*—Saeed T Chaudhry
(74) *Attorney, Agent, or Firm*—Marshall, Gerstein & Borun LLP

(57) ABSTRACT

Process for the cleaning of an installation, whereby the installation is rinsed with an alkaline cleaning solution and the result of the cleaning is tested by means of an indicator agent on the basis of permanganate in an alkaline environment. In order to make the cleaning more economical and less productive of waste water, the indicator agent that is used as an indicator is introduced into the alkaline cleaning solution for further use as a cleaning agent.

11 Claims, 1 Drawing Sheet

PROCESS FOR CLEANING AN INSTALLATION

CROSS-REFERENCE TO RELATED APPLICATION

The present application claims the benefit of priority of German Patent Application No. 10 2006 060 204.8 filed Dec. 18, 2006. The entire text of the priority application is incorporated herein by reference in its entirety.

FIELD OF THE DISCLOSURE

The disclosure relates to a process for cleaning an installation such as cleaning a membrane filter in decanting beverages.

BACKGROUND

One such process is known from WO 2005/044968. A large number of cleaning processes are described in that publication, all of which work with a cleaning-, disinfection-, and indicator agent based upon a permanganate, particularly potassium permanganate, in an alkali environment. This agent is available on the commercial market, and has also been described in EP 1 343 864, for example. The cleaning-, disinfection-, and indicator agent that is used contains, apart from the water-soluble permanganate, an additional oxidation agent, the oxidation potential of which lies above that of Mn VII to Mn VI. The acidic environment can already be adjusted in the product sold, but is, however, preferably adjusted by the client by mixing with an alkaline agent, whereby the pH value should preferably amount to at least twelve. In the latter case, the cleaning-, disinfection-, and indicator agent additionally contains pH buffer substances, preferably primary and/or secondary alkali carbonates, such as sodium carbonate and/or sodium hydrogen carbonate, for example, as well as oxidation-resistant polyphosphates. In the compound described, permanganate, particularly potassium permanganate, can be used as a very effective cleaning agent with a disinfecting effect. Since potassium permanganate, depending on the level of contaminants contained, shows changes in color from an initial violet to green and yellow when flowing through the installation to be cleaned, the known agent can also be used as an indicator solution in order to test the level of cleaning. If the fluid circulating in the installation remains violet after the addition of the potassium permanganate, then the installation has been sufficiently cleaned. A change in color to green, and particularly to yellow, however, indicates that the installation has only been incompletely cleaned or is not yet clean, as the case may be. Upon use as a cleaning agent, the known agent can be used in a so-called stack-type cleaning—that is to say, it is collected after passing through the installation and, after refreshing, if necessary, it is used again in the next cleaning process. The indicator is then no longer fully usable during the next cleaning process, however, since it has, in fact, already been partially used up. A good evaluation of the success of the cleaning is then no longer possible to an unlimited extent, since the cleaning fluid has the characteristic of reacting more sensitively during color changes when in its basic condition (that is to say, from purple to green and yellow, for example) than it does during color changes in an already slightly-used condition (that is to say, from green to yellow, for example). In order to be able to carry out an optimal cleaning test in the previous stack-type cleaning, an expensive new formulation of the solution must therefore be carried out after every cleaning. In the known process, the agent must be discarded upon use as a (sole) indicator agent.

SUMMARY OF THE DISCLOSURE

The task that forms the basis of the disclosure is that of making a process available for the cleaning of an installation that works economically while producing little waste water.

By means of the process in accordance with the disclosure, the indicator agent that is used as an indicator is moved along to a very useful and economical additional processing, since it is reused as a cleaning agent after being used as an indicator.

Advantageous further improvements of the disclosure are to be derived from the sub-claims.

The disclosure is particularly usable in a stack-type cleaning process during the use of an alkaline cleaning solution—that is to say, in a process in which the alkaline cleaning solution is also collected for reuse, whereby the indicator agent used is suitably used to refresh the alkaline cleaning solution.

The indicator agent should suitably be used after the conclusion of the cleaning process, but preferably before a sterilization process, particularly if a continuous sterilization is necessary.

The effect of the indicator agent can be examined visually, but is, however, preferably determined by means of a monitoring device that compares the values determined with a theoretical value.

The actual values and the theoretical values of the indicator effect can be set as absolute values, but are, however, preferably determined in a "before/after" adjustment of the color values.

The process is particularly well suited for the cleaning of a membrane filter, particularly of a synthetic hollow fiber filter.

BRIEF DESCRIPTION OF THE DRAWINGS

One embodiment of the disclosure is illustrated in further detail in the following by means of the sole diagram, FIG. 1.

DETAILED DESCRIPTION

Figure 1:
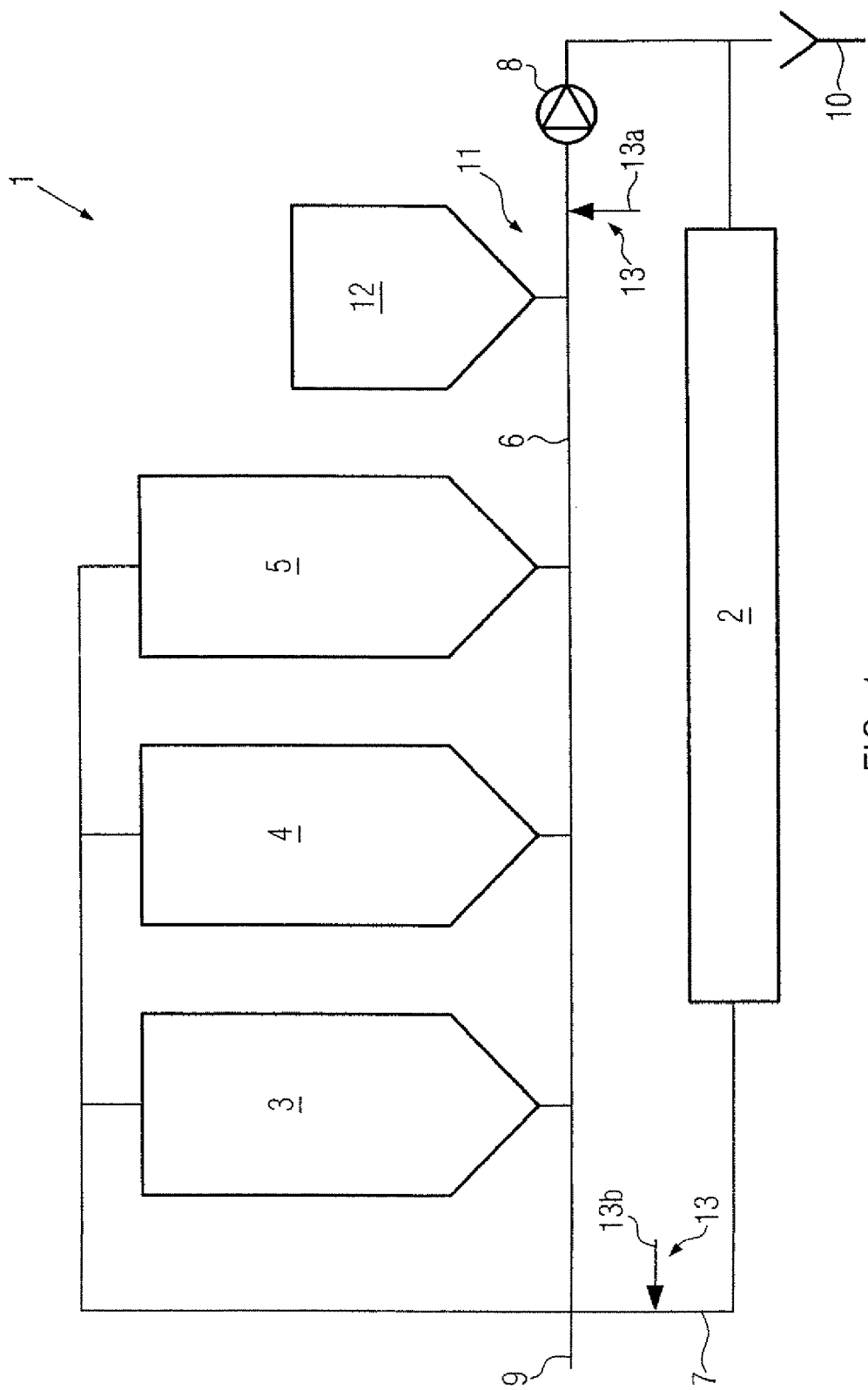

FIG. 1 depicts, in a highly schematized representation, a device 1 for the cleaning of an installation 2, which is only depicted as a single block. The device 1 can be based upon any known device, particularly a CIP (clean-in-place) device, such as has also already been previously used for the cleaning of installations. The device 1 can be used for the cleaning of any installations 2 desired, but is, however, preferably used for the cleaning of installations for food technology, particularly in decanting beverages. The installation 2 may contain membrane filters, particularly synthetic hollow fiber filters, in which it was determined that these could only suitably clean foods by means of conventional processes with difficulty.

The device 1 contains the usual components of such types of cleaning installations for stack-type cleaning (batch-wise cleaning), such as, for example, a storage container 3 for one of the alkaline solutions commonly used, a storage container 4 for one of the acids commonly used, and a storage container 5 for hot water, if necessary, which are each connected with the installation 2 by way of a preferably joint forward flow pipe 6 and reverse flow pipe 7. A pump 8 and the common valves and armatures, not depicted in FIG. 1, are provided inside the forward flow pipe 6. A water connection 9 (cold water or drinking water, if necessary) and a waste water pipe 10 are additionally present.

The substances used—that is to say, in the embodiment presented, the alkaline solution, the acid, and the hot water—correspond to the substances that are also used in conventional CIP cleaning installations. Thus, for example, the alkaline solution in the storage container 3 can have a temperature of between 85 and 95 degrees centigrade, particularly 90 degrees centigrade, and the acid in the storage container 4 can range from room temperature up to 60 degrees centigrade. The storage container 5 for hot water is only necessary when a continuous sterilization is necessary. The container 5 contains hot water under conditions of pressure and temperature that ensure a temperature of reverse flow of between 120 degrees centigrade and 130 degrees centigrade.

The device 1 contains, furthermore, an introduction device 11 for an indicator agent. The introduction device 11 can be connected with a storage tank 12, or else it can be configured as a continuous, in-line introduction unit. The storage tank is preferably connected directly with the installation 2, and preferably has such a volume that the installation 2 can be checked repeatedly. The volume of the storage tank 12 is preferably smaller than the volume of the alkaline solution container 3, the volume of the storage container 4, as well as the volume of the container 5. While the containers 3, 4, and 5 are connected with one another, the storage tank 12 is only connected with the installation 2 by way of the introduction device 11.

The introduction device 11 is located in the forward flow unit 6, in front of the installation 2, downstream from the last cleaning agent container and, preferably, upstream from the pump 8. An indicator agent is introduced into the forward flow unit through the introduction device 11. The indicator agent is, preferably, an agent on the basis of permanganate, particularly potassium permanganate, which, while originally being violet, reacts very sensitively with organic contaminating substances with an attenuation of color or a change of color to green or, in the event of heavy contamination, as the case may be, to yellow. The pollutant particles are thereby simultaneously oxidized, from which the good cleaning effect of the agent results. Finally, potassium permanganate is also known for its good disinfection effect, which additionally contributes to the excellent suitability of potassium permanganate in cleaning, particularly of installations conducting foods. The permanganate is used in an acidic environment, which is preferably adjusted through the mixing in of the alkaline solution which is, in any event, present inside the device 1. The pH value should amount to at least 11, and preferably to 12. Every commercially available indicator agent that can simultaneously carry out a cleaning effect and, preferably, the cleaning-, disinfection-, and indicator agent described in detail in the above-stated WO 2005/044968, to which reference is hereby explicitly made, is suitable for use as an indicator agent.

The temperature of the indicator agent preferably amounts to 40 to 50 degrees centigrade.

The monitoring of the cleaning effect—that is to say, the change in the color value through the brightening of the original violet color or through the change of color to green or yellow—can be observed visually but is, however, preferably determined by means of a monitoring device 13. The monitoring device 13 preferably contains a first color value detector 13-a which is positioned in front of the installation 2 (in the forward flow pipe 6) and determines the initial color value of the indicator solution, and a second color value detector 13-b positioned behind the installation 2 (in the reverse flow pipe 7), which [detector] determines the color value after the passage through the installation 2. Any known device, and preferably a so-called photo-eye, can be used as a color value detector. However, other changes of the indicator-, disinfection-, or cleaning agent, respectively, such as the altered and/or remaining oxidation potential, for example, can also be determined/measured. Measuring methods that do not carry out any evaluation of image (color change with a photo-eye), but instead detect a direct chemical effect through the measurement of the pH value, for example, are therefore also conceivable.

The indicator agent can have a color value that has been previously determined and stored in memory, so that only one color value detector is necessary in the reverse flow unit; the original color value, however, is preferably determined immediately downstream from the introduction device 11 with the help of the monitoring device 13. The indicator formulation or solution is then sent through the installation 2, and the change in the color value is determined in the reverse flow pipe 7. If the color value has not changed, or if it has only changed to an insignificant degree, then it is to be assumed that the installation 2 no longer contains any organic pollutant component. If a change of color value that lies outside of the range of tolerance determined in advance is detected, then it can be concluded that the cleaning/disinfection was not sufficient and that one or more of the cleaning steps mentioned above must be repeated. The indicator agent used as an indicator, after it has fulfilled its function as an indicator, is collected for additional use as a cleaning agent. The indicator agent is preferably filled into the alkaline solution container 3 through the reverse flow pipe 7, and replenishes there the loss of stored alkaline solution (up to 30%) that has occurred during the cleaning process. That is to say, the alkaline solution stored in the alkaline solution container 3 can also be subsequently strengthened, if necessary, by adding fresh alkaline solution at the necessary pH value, and can be kept at the necessary temperature by means of subsequent heating. Both the pH value as well as the temperature are suitably determined by means of conventional measures, and are also monitored, if necessary.

A good disinfecting effect is already achieved through the use of the indicator agent based upon potassium permanganate. If more sterile conditions are necessary, however, then sterilization with hot water is carried out after the use of the indicator.

For the implementation of the process in accordance with the disclosure, one of the conventional cleaning processes, such as the cleaning process with the following process steps, for example, is first of all carried out:

1) Rinsing with water from the cold water connection 9.
2) Alkaline solution cleaning—that is to say, conducting stored alkaline solution from the alkaline solution tank and through the installation 2 over a predetermined interval of time.
3) Rinsing with water from the cold water connection 9.
4) Acid cleaning (if necessary)—that is to say, conducting stored acid out of the storage container 4 and through the installation 2 over a predetermined interval of time.
5) Rinsing with water from the water connection 9.
6) Introducing the indicator agent through the introduction device 11 in a predetermined quantity and/or over a predetermined interval of time.
7) Conveying the indicator agent used back into the alkaline solution container 3.
8) Rinsing with water—with drinking water, in the event that there are no additional sterility requirements, and with sterile water (cold), in the event of high sterility requirements.
9) Sterilization with hot water and/or steam from the container 5, if necessary.

The used indicator agent that is conveyed back into the alkaline solution container 3 has lost none of, or scarcely any of, its cleaning- and disinfection effect, which should normally have led to a satisfactory removal of pollutants, because of its use after the cleaning process. Since the cleaning- and disinfection effect of the agent is not connected with the indicator effect, it may also happen that the cleaning- and disinfection effect is increased, although the indication effect is reduced. Because of that fact, the indicator agent amplifies the cleaning effect of the alkaline solution, which always leads to better cleaning results, so that the time for passage through the alkaline solution can be reduced, for example.

In a modification of the embodiment described and diagrammed, the process in accordance with the disclosure can be used in any known cleaning process, whereby the course of the cleaning and the cleaning agents used can be adjusted to the type of pollutant particles to be removed. The monitoring of the cleaning result—that is to say, the monitoring of the color value, including a possible change in color—can also be carried out visually, if necessary.

The invention claimed is:

1. A process for the cleaning of an installation, comprising the steps of rinsing the installation with an alkaline cleaning solution, testing the result of the cleaning for compliance with a previously determined final cleaning result by using an indicator agent on the basis of permanganate in an alkaline environment, and subsequently introducing the indicator agent that is used as an indicator into the alkaline cleaning solution for further use as a cleaning agent in a subsequent cleaning step.

2. A process in accordance with claim 1, and collecting the alkaline cleaning solution, after the cleaning run, in an alkaline solution container for reuse.

3. A process in accordance with claim 2, and introducing the indicator agent used into the alkaline solution container.

4. A process in accordance with claim 1, and rinsing the installation with at least one additional agent, and introducing the indicator agent into the installation after the last cleaning step.

5. A process in accordance with claim 1, and introducing the indicator agent into the installation before a sterilization step.

6. A process in accordance with claim 1, and determining a change brought about by the indicator agent by means of a monitoring device, and comparing that determined change with a theoretical value.

7. A process in accordance with claim 6, wherein the monitoring device has a first and a second color value detector, whereby the first color value detector is positioned in front of the entrance of the indicator agent into the installation, and the second color value detector is positioned after the exit of the installation.

8. A process in accordance with claim 6, wherein the change brought about is a change in color.

9. A process in accordance with claim 1, wherein before the testing of the cleaning result, locating the indicator agent inside a storage tank.

10. A process in accordance with claim 1, and using the process for the cleaning of a membrane filter.

11. A process in accordance with claim 10, wherein the membrane filter is a synthetic hollow fiber filter.

\* \* \* \* \*